(12) United States Patent
Cho et al.

(10) Patent No.: US 6,221,423 B1
(45) Date of Patent: Apr. 24, 2001

(54) SHORT-CHAINED PEPTIDE MATERIAL

(75) Inventors: Myong J. Cho, Chesterfield, MO (US); David A. Singer, St. Louis, MO (US); Santa H. Lin, deceased, late of St. Louis, MO (US), by Terry T. Lin, executor

(73) Assignee: Protein Technologies Int'l Inc., St. Louis, MO (US)

( * ) Notice: Subject to any disclaimer, the term of this patent is extended or adjusted under 35 U.S.C. 154(b) by 0 days.

(21) Appl. No.: 09/059,655

(22) Filed: Apr. 13, 1998

(51) Int. Cl.[7] .............................. A23J 1/00; A23J 1/14; A23J 1/20
(52) U.S. Cl. ..................... 426/656; 426/657; 435/68.1; 530/343
(58) Field of Search ..................... 426/656, 657; 435/68.1; 530/343

(56) References Cited

U.S. PATENT DOCUMENTS

| | | |
|---|---|---|
| 2,999,753 | 9/1961 | Witwicka et al. . |
| 3,391,001 | 7/1968 | Sair et al. . |
| 3,640,725 | 2/1972 | Sharba et al. . |
| 3,713,843 | 1/1973 | Pour-el et al. . |
| 3,733,207 | 5/1973 | McCabe . |
| 3,741,771 | 6/1973 | Pour-El et al. . |
| 3,761,353 | 9/1973 | Noe . |
| 3,830,942 | 8/1974 | Hawley . |
| 3,846,560 | 11/1974 | Hempenius et al. . |
| 3,857,966 | 12/1974 | Feldman et al. . |
| 3,876,806 | 4/1975 | Hempenius et al. . |
| 3,897,570 | 7/1975 | Yokotsuka et al. . |
| 3,966,921 | 6/1976 | Morehouse et al. . |
| 4,015,019 | 3/1977 | Sawada et al. . |
| 4,107,334 | 8/1978 | Jolly . |
| 4,138,500 | 2/1979 | Fulger et al. . |
| 4,443,540 | 4/1984 | Chervan et al. . |
| 4,482,574 | * 11/1984 | Lee . |
| 4,600,588 | 7/1986 | Ernster . |
| 4,687,739 | 8/1987 | Sugisawa et al. . |
| 4,757,007 | 7/1988 | Satoh et al. . |
| 4,940,662 | 7/1990 | Yamazuki et al. . |
| 5,077,062 | 12/1991 | Ernster . |
| 5,180,597 | 1/1993 | Hamm . |
| 5,314,873 | * 5/1994 | Tomita et al. . |
| 5,356,637 | 10/1994 | Loosen et al. . |
| 5,405,756 | 4/1995 | Naito et al. . |
| 5,618,689 | * 4/1997 | McCarthy et al. . |
| 5,952,193 | * 9/1999 | Shimamura et al. . |

FOREIGN PATENT DOCUMENTS

| | | |
|---|---|---|
| 0461261A1 | 12/1991 | (EP) . |
| 62-124744 | 11/1988 | (JP) . |
| 1-055192 | 3/1989 | (JP) . |
| 4-248959 | 9/1992 | (JP) . |
| 6-014747 | 1/1994 | (JP) . |
| 6-245790 | 9/1994 | (JP) . |
| 6-343422 | 12/1994 | (JP) . |

OTHER PUBLICATIONS

Database Abstract. AN: 80(05):G0374 FSTA. Lecture. European Biochemical Societies. Authors: Ricks et al, 1978.*
Hansen, *"Vegetable Protein Processing"*, pp. 133–144; (1974).

* cited by examiner

*Primary Examiner*—Anthony J. Weier
(74) *Attorney, Agent, or Firm*—Richard B. Taylor

(57) ABSTRACT

A short chain peptide material is provided containing a peptide material derived from a protein material. At least a majority of the peptides in the peptide material have a peptide chain length of 7 peptides or less. The peptide material is at least 95% soluble in an aqueous solution having a pH at which the protein material from which the peptide material is derived is insoluble. A process for forming the short chain peptide material is also provided. A slurry is formed of a protein material at a pH at which the protein material is substantially insoluble. The protein material is contacted with an enzyme having substantial endopeptidase activity and substantial exopeptidase activity at a temperature and for a time sufficient to form the peptide material of the invention.

20 Claims, No Drawings

SHORT-CHAINED PEPTIDE MATERIAL

BACKGROUND OF THE INVENTION

This invention relates to processes for producing acid-soluble short-chain peptides from a protein material, to the short-chain peptides produced thereby, and to edible compositions containing these short-chain peptides.

Many foods and beverages are fortified with supplemental protein derived from various plant and animal sources to increase the nutritional value of the food or beverage. Commonly used inexpensive supplemental protein sources include vegetable protein materials such as soybeans, legumes, oilseeds, and rapeseed, and animal protein materials such as casein.

Unmodified protein materials derived from such protein sources cannot be used effectively as a supplement in certain beverages and food compositions in which nutritional fortification is desirable. One such group of beverages in which protein fortification is desirable are acidic beverages such as soft drinks, carbonated soft drinks, juices, and nutritional sports beverages. Acidic beverages, however, have pH levels at which unmodified protein materials are generally insoluble. Unmodified protein materials added to such acidic beverages cause undesirable cloudiness and sedimentation.

Another group of compositions in which protein fortification is desirable but not practicible with unmodified protein materials are enteral compositions for providing nutrition to persons having impaired digestive function. Persons having impaired digestive function are often incapable of fully absorbing and digesting unmodified protein, therefore effective enteral compositions cannot be formed using such protein materials.

It is known in the art to modify supplemental protein materials by hydrolyzing the protein to form peptides which are useful as nutritive components of foods and beverages in which unmodified proteins cannot be utilized. Protein hydrolyzates are commonly used to form nutritional acidic beverages since protein hydrolyzates are more soluble in acidic aqueous solutions than unmodified proteins, and are used to form enteral compositions since the protein hydrolyzate peptides are more easily absorbed and digested than unmodified proteins.

Protein materials are often hydrolyzed by treatment with a proteolytic enzyme under conditions at which the enzyme hydrolyzes the protein into peptides of intermediate length. Intermediate length peptides are generally more soluble in acidic solutions than unmodified proteins and have been used to form nutritionally enhanced acidic beverages.

Hydrolysis of the protein material into short-chain peptides is conventionally avoided to prevent the formation of "off-flavor" or "bitter" materials. For example, U.S. Pat. No. 3,897,570 to Yokotsuka et al. provides a process for producing an acid soluble protein beverage in which a slurry is formed of a protein material, the slurry is heated by steam under pressure to denature the protein in the slurry, the protein is hydrolyzed with an acid protease at a pH of 2.5–6.0 so the ratio of formol state nitrogen to total nitrogen in the filtrate of the slurry is less than 20% to prevent over-decomposition of the protein, and the slurry is filtered to separate a solution containing acid soluble peptides from insoluble residual materials. Other such processes for producing an acidic protein beverage are disclosed in U.S. Pat. Nos. 3,846,560 and 3,876,806 to Hempenius et al. in which a slurry of protein material is hydrolyzed with a proteolytic enzyme and the hydrolysis is terminated before it proceeds to the point of producing a significant amount of products which cause a bitter taste.

Enzymatic hydrolysis of protein materials is often conducted under conditions which facilitate the formation of intermediate length peptides. Frequently, enzymatic hydrolysis is conducted on protein materials which are partially to substantially solubilized in a solution containing the enzymes. Solubilized protein material is more easily accessible to the proteolytic enzymes than insoluble protein material since a substantial portion of the solubilized protein is exposed to enzymic activity. Intermediate length peptides are easily formed from a solubilized protein material since the enzymes can cleave centrally located peptide bonds in the protein which would not be exposed to enzymic activity if the protein material were insoluble in the solution.

The solubility of a protein material in a solution is determined by the pH of the solution relative to the isoelectric point of the protein material. Protein materials are least soluble at or near the isoelectric point of the protein, which typically is a pH which is moderately acidic (e.g. soy protein has an isoelectric point at about pH 4.5, and casein has an isoelectric point at about pH 4.7). The solubility of a protein material in a solution increases as the pH of the solution moves away from the isoelectric point of the protein, therefore, protein materials tend to be more soluble in basic, neutral, and strongly acidic mediums.

Several processes are known for enzymatically hydrolyzing protein materials under neutral, basic, or strongly acidic pH conditions. Often the pH conditions of the proteolysis are selected to optimize the activity of the enzyme rather than to determine length of the resulting peptides. For example, U.S. Pat. No. 4,107,334 to Jolly provides that the pH of the enzymatic hydrolysis depends on the nature of the protein to be hydrolyzed and the proteolytic enzyme employed, and is selected to optimize the conversion of the protein to functional protein, and then provides several examples in which enzymatic protein hydrolysis is effected at pHs of 2.5 and 7.0–9.5. U.S. Pat. No. 4,687,739 to Sugisawa et al., and U.S. Pat. Nos. 3,876,806 and 3,846,560 to Hempenius et al. disclose processes for enzymatically hydrolyzing a protein material at a neutral pH. U.S. Pat. Nos. 3,741,771 and 3,713,843 to Pour-El provide processes for enzymatically hydrolyzing a protein material under strongly acidic pH conditions.

Another factor which facilitates the formation of intermediate length peptides from a protein material, as opposed to short-chain peptides, is the type of enzyme commonly selected for hydrolyzing the protein material. Enzymes commonly employed to hydrolyze a protein material have primarily endopeptidase (or "protease") activity. Endopeptidases cleave a protein material between amino acids located in the interior of the protein, and produce two peptides of relatively substantial molecular weight each time the endopeptidase cleaves the protein material (as compared to exopeptidases which cleave amino acids at or near the end of the protein and produce a large molecular weight peptide and a small molecular weight peptide or an amino acid). Endopeptidases are commonly employed in protein hydrolysis since the endopeptidases rapidly cleave the protein material into smaller, but still substantial, peptides which are more acid soluble than intact protein, and may be more easily absorbed and digested than intact protein. For example, U.S. Pat. No. 4,687,739 teaches that soybean protein is enzymatically hydrolyzed in the process with an endopeptidase, U.S. Pat. No. 3,897,570 provides that any acid protease may be used in the process to hydrolyze soybean protein, U.S Pat. No. 3,713,843 discloses that the enzymes useful to treat proteins in the process are enzymes which are active in breaking the peptide bond, and U.S. Pat.

No. 4,107,334 provides that any acid, neutral, or alkaline protease is suitable for use in the process.

Non-bitter short-chain peptides, however, are more desirable than intermediate length peptides in numerous applications, including acidic beverages and enteral compositions. Short-chain peptides are more soluble in an acidic medium, and do not tend to settle out of solution as some intermediate length peptides do. Therefore, short-chain peptides are very useful for forming acidic nutritional beverages which are not subject to cloudiness or precipitation. Short-chain peptides are more desirable in enteral compositions than intermediate length peptides because short-chain peptides are more easily absorbed and digested than intermediate length peptides.

European Patent Application No. 0 461 261 A1 provides a short-chain peptide composition which is rich in branched chain amino acids and low in aromatic amino acid content, and a method of making the composition. The application discloses that the composition is formed by hydrolyzing an animal or a plant protein with an enzyme composition having exopeptidase activity and endopeptidase activity, where the exopeptidase activity is used to lower the aromatic amino acid content.

In the process of EP 0 461 261 A1, the enzymolysis of the protein is conducted only at neutral pH—which results in a peptide composition having a varied peptide chain-length profile, since the protein is at least partially soluble at neutral pH, and is likely to be cleaved into intermediate length peptides by the endopeptidase enzymes. These intermediate length peptides are subject to reaction with the exopeptidases (as well as further cleavage by endopeptidases) and are likely shorter in peptide chain length than the intermediate length peptides formed according to the processes discussed above. However, due to the enzymolysis at neutral pH, intermediate chain length peptides are still likely to be present in the resulting composition to an appreciable extent.

U.S. Pat. No. 3,830,942 to Hawley provides a soluble protein product for use in highly acid foods, and a process for making the same. An aqueous slurry is formed of a vegetable protein or soy protein isolate having a pH at approximately the isoelectric point of the protein. The slurry may be heated to make the protein more susceptible to the action of the enzymes. The protein is then hydrolyzed with any enzyme effective in the pH range of the isoelectric point of the protein. The resulting peptides are shorter in length than intermediate length peptides formed by enzymatic hydrolysis at pH levels in which the protein material is soluble since enzymatic hydrolysis is confined only to insoluble protein material exposed to the enzymes. However, due to the use of enzymes which have predominately or exclusively endopeptidase activity, the resulting composition contains an appreciable amount of intermediate length peptides.

It is desirable to produce an enzymatically hydrolyzed protein material having a narrow range of peptide chain lengths where a significant quantity of the peptides have a chain length of 7 peptides or less. Such an peptide material is of particular use in acidic beverages and enteral compositions.

SUMMARY OF THE INVENTION

In one aspect, the invention is a hydrolyzed protein material which comprises a peptide material derived from a protein material. At least a majority of the peptides in the peptide material have a peptide chain length of 7 peptides or less. The peptide material has a solubility of at least 95% in an aqueous solution having a pH at which the protein material from which the peptide material is derived is substantially insoluble.

In a preferred embodiment of the invention, at least a majority of the peptides in the peptide material have a peptide chain length of from 2 to 5 peptides.

In a further preferred embodiment, the hydrolyzed protein material is at least 99% soluble in an aqueous solution having a pH at about the isoelectric point of the protein material.

In another aspect, the invention is a solution of a hydrolyzed protein material comprising a peptide material derived from a protein material, and an aqueous medium having a pH at which the protein material from which the peptide material is derived is substantially insoluble. At least a majority of the peptides in the peptide material have a peptide chain length of 7 peptides or less, and at least 95% of the peptide material is soluble in the aqueous medium.

In a further aspect, the invention is a process for obtaining a non-bitter, acid-soluble short chain peptide material from a protein material. An aqueous slurry is formed of a protein material which has a pH at which the protein material is substantially insoluble. An enzyme preparation having both substantial exopeptidase and substantial endopeptidase activity is contacted with the slurry of protein material at a temperature and for a time period effective to hydrolyze a portion of the protein material into peptides which are soluble in the aqueous slurry, where at least a majority of the peptides have a peptide chain length of less than or equal to 7 peptides.

In yet another aspect, the invention is a nutritional composition which is easily absorbed and digested. The composition contains a consumable acidic aqueous solution having a pH of less than 6, and a peptide material which is derived from a protein material. A majority of the peptides in the peptide material have a peptide chain length of 7 peptides or less, where the peptide material is at least 99% soluble in the acidic aqueous solution.

DESCRIPTION OF THE PREFERRED EMBODIMENTS

The present invention resides in the discovery that a peptide material having a narrow distribution of very short chain peptides can be produced by hydrolyzing a protein material with an enzyme preparation having both substantial exopeptidase activity and substantial endopeptidase activity at a pH at which the protein material is substantially insoluble. Utilization of an enzyme preparation having both substantial endopeptidase and substantial exopeptidase activity and an insoluble protein material are critical to the formation of the short chain peptides of the present invention. Enzymic hydrolysis of a substantially insoluble protein material increases the production of short chain peptides since only small portions of a substantially insoluble protein material are exposed to enzymic action relative to the same protein material when substantially solubilized in a proteolytic enzyme solution. Use of an enzyme or enzymes having substantial endopeptidase and substantial exopeptidase activity provides greater cleavage of the protein material and the resulting peptides formed from the protein material, than an enzyme having only endopeptidase activity or exopeptidase activity. The combination of utilizing an enzyme preparation having both substantial endopeptidase and substantial exopeptidase activity with an insoluble protein material substrate permits the formation of the peptide material of the present invention.

The starting material for the process of the present invention is a protein material. Preferably the protein material is either casein or a vegetable protein material. Casein is prepared by coagulation of a curd from skim milk. The casein is coagulated by acid coagulation, natural souring, or rennet coagulation. To effect acid coagulation of casein a suitable acid, preferably hydrochloric acid, is added to milk to lower the pH of the milk to about the isoelectric point of the casein, preferably to a pH of about 4 to about 5, and most preferably to a pH of about 4.6 to about 4.8. To effect coagulation by natural souring, milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Vegetable protein materials useful in the present invention include legumes, oilseeds, rapeseed, and peas. Preferably, the vegetable protein material is a vegetable protein concentrate or a vegetable protein isolate. As used herein, and according to conventional definition, a vegetable protein concentrate is a vegetable protein material containing 65%–90% protein on a dry basis, and a vegetable protein isolate is a vegetable protein material containing at least 90% protein on a dry basis. Vegetable protein concentrates and isolates are readily commercially available. For example, soy protein isolates which may be used in the process of the present invention are available from Protein Technologies International, Inc., St. Louis, Mo., and are sold under the trade name EDIPRO A®.

Vegetable protein concentrates and vegetable protein isolates may be prepared according to conventional methods. Vegetable protein concentrates are commonly prepared by (i) leaching a vegetable protein material with an aqueous solution having a pH at about the pH of the isoelectric point of the protein; (ii) extracting a vegetable protein material with an aqueous alcohol; or (iii) denaturing a vegetable protein material with moist heat, followed by extraction of the denatured vegetable protein material with water.

In a preferred embodiment, a soy protein concentrate is prepared for use in the method of the present invention. Commercially available defatted soy flakes (dehulled and defatted soybeans) are washed with an aqueous solution having a pH at about the isoelectric point of soy protein, preferably at a pH of about 4 to about 5, and most preferably at a pH of about 4.4 to about 4.6. The aqueous acidic solution leaches water soluble carbohydrates, minerals, phenolics, and other non-proteinaceous materials away from the soy protein, which is insoluble in the aqueous solution at its isoelectric point, leaving the soy protein concentrate.

Vegetable protein isolates are formed by extracting a vegetable protein material with an aqueous alkaline solution to solubilize protein material. The solubilized protein material extract is then separated from insoluble vegetable matter such as cellulose and other vegetable fibers. The pH of the protein extract is then adjusted to about the isoelectric point of the protein to precipitate the protein. The precipitated protein is separated from the solution by filtration or centrifugation to separate the protein material from water soluble carbohydrates, minerals, phenolics, and other non-proteinaceous materials which remain in the solution. The separated protein is then washed with water to form the protein isolate.

In a most preferred embodiment, a soy protein isolate is prepared for use in the method of the present invention. Commercially available defatted soy flakes are utilized as the starting material. Preferably the soy flakes have been treated with a sulfite such as sodium sulfite for improved flow characteristics and improved microbial control. The soy flakes are extracted with an aqueous alkaline solution, preferably an aqueous sodium hydroxide solution, having a pH from about 8 to about 11. Preferably the weight ratio of the extractant to the soy flake material is from about 5:1 to about 16:1. The extract is separated from the insoluble materials such as soy fiber and cellulose by filtration or by centrifugation and decantation of the supernatant extract from the insoluble materials. The pH of the separated extract is adjusted to about the isoelectric point of soy protein, preferably from about pH 4 to about pH 5, most preferably from about pH 4.4 to about pH 4.6, with a suitable acid, preferably hydrochloric acid or phosphoric acid to precipitate a soy protein material. The precipitated protein material is separated from the extract, preferably by centrifugation or filtration. The separated protein material is washed with water, preferably at a weight ratio of water to protein material of about 5:1 to about 12:1 to produce the soy protein isolate.

An aqueous slurry of the vegetable or animal protein starting material is formed by mixing the protein material with water to form a slurry. Preferably the slurry should contain from about 2% to about 30% of the protein material by weight, and more preferably should contain from about 5% to about 20% of the protein material by weight, and most preferably should contain from about 10% to about 18% of the protein material by weight.

The pH of the slurry of protein material is adjusted to a pH at which the protein material is substantially insoluble to reduce the exposure of the protein material to enzymic action so that short chain peptides may be produced when the protein material is exposed to proteolytic enzymes. If the protein material is soy protein or casein, the pH of the slurry may be adjusted to about 3 to about 6, and more preferably from about 4 to about 5, to render the protein material substantially insoluble in the slurry. Most preferably, the pH of the slurry is adjusted to about the isoelectric point of the protein material, about pH 4.5 for soy protein and about pH 4.7 for casein, to minimize the solubility of the protein material in the solution. The pH of the slurry may be adjusted downward with any suitable acidic reagent such as hydrochloric acid or phosphoric acid, and may be adjusted upward with any suitable basic reagent such as sodium hydroxide, potassium hydroxide, or ammonium hydroxide, and preferably is adjusted with a foodgrade reagent.

Preferably, the slurry of protein material is treated at a temperature and for a period of time effective to thermally denature the protein material. Denaturation causes the protein material to unfold so that more of the insoluble protein material will be exposed to enzymic proteolysis upon addition of a proteolytic enzyme to the slurry. Preferably the slurry is heated to a temperature of from about 70° C. to about 160° C. for a period of time sufficient to denature the protein material. The duration of heating required to denature the protein material is dependent on the temperature, with shorter time periods being required to denature the protein material at higher temperatures. Preferably the slurry is heat treated to denature the protein material for a period of from about 5 seconds to about 30 minutes. In one embodiment, the slurry is heated to about 70° C. for about 30 minutes to denature the protein material. In another embodiment, the slurry is treated at about 155° C. for a period of about 10 seconds to denature the protein material.

After the protein material in the slurry is denatured, the slurry is cooled to about 50° C. to prevent thermal deactivation of the enzyme preparation to be added to the slurry after denaturing. The slurry may be cooled in any conventional manner for cooling, including refrigeration and exposure to room temperature.

After denaturation of the protein material, if any, the insoluble protein material in the slurry is contacted with an enzyme preparation having both substantial endopeptidase activity and substantial exopeptidase activity to hydrolyze the protein material. The enzyme preparation may contain a single enzyme having both exo- and endopeptidase activity, or may contain a mixture of enzymes which together provide both exo- and endopeptidase activity. The enzymes used in the enzyme preparation may be derived from a variety of sources, including natural sources, synthetic sources, and modified natural enzymes.

In order to produce the peptide material of the present invention having a narrow distribution of peptide chain lengths, where at least a majority of the peptides have a chain of 7 peptides or less, the enzyme preparation requires an exopeptidase activity of at least about 500 leucine aminopeptidase units per gram (LAP/g) and an endopeptidase activity of at least about 2000 tyrosine units per gram (TU/g). In a preferred embodiment, the enzyme preparation has an exopeptidase activity of at least about 600 LAP/g. Preferably, the enzyme preparation has an endopeptidase activity of at least about 2500 TU/g.

In a preferred embodiment the enzyme preparation contains a single enzyme having both exo- and endopeptidase activity which is derived from the fungal source *Aspergillus oryzae*. Not all enzyme preparations derived from *Aspergillus oryzae* have sufficient endo- and exopeptidase activity to produce the oligopeptide material of the present invention, therefore, it is important to select an *Aspergillus oryzae* enzyme preparation having the required levels of activity described above. Particularly preferred commercially available *Aspergillus oryzae* enzymes having both exo- and endopeptidase activity for use in the process of the present invention include ENZECO FUNGAL PROTEASE CONCENTRATE I™, available from Enzeco Development Corporation, New York, N.Y.; FP 500,000™, available from Gist-Brocades N.V., Ma Delft, Netherlands; and PROTEASE 2A I™ and PROTEASE 2A II™, available from Amano Enzymes, Troy, Va.

To contact the protein material with the enzyme preparation, the enzyme preparation is added to the slurry of protein material. Sufficient enzyme preparation should be added to the slurry to effect the conversion of the protein material into the peptide material of the invention at a temperature at which the enzyme or enzymes in the enzyme preparation is/are active, and at a pH at which the protein material is substantially insoluble. Preferably from about 0.1% to about 10%, by dry weight of the slurry solids, of the enzyme preparation is added to the slurry, more preferably from about 0.5% to about 5%, by dry weight of the slurry solids, even more preferably from about 0.8% to about 2%, by dry weight of the slurry solids, and most preferably, from about 1% to about 1.5%, by dry weight of the slurry solids, of the enzyme preparation is added to the slurry to effect the hydrolysis.

The enzymatic hydrolysis of the protein material is conducted at a temperature effective to promote the hydrolysis. In a preferred embodiment, the hydrolysis is conducted at a temperature of from about 5° C. to about 75° C. More preferably, the hydrolysis is conducted at a temperature of from about 30° C. to about 70° C., and most preferably is conducted at a temperature of from about 40° C. to about 60° C.

The enzymatic hydrolysis is conducted at a pH at which the protein substrate is substantially insoluble, and at which the enzyme(s) in the enzyme preparation is/are active. The pH at which the hydrolysis is to be effected should be determined by determining the pH range at which the protein material is substantially insoluble, and will depend on the protein substrate to be hydrolyzed. Typically, the hydrolysis may be effected at a pH of from about 3 to about 6, and more preferably from about 4 to about 5. Most preferably, the hydrolysis is conducted at about the isoelectric point of the protein material. For example, enzymatic hydrolysis of a soy protein material is most preferably effected at a pH of from about 4.4 to about 4.6, and enzymatic hydrolysis of casein is most preferably effected at a pH of from about 4.6 to about 4.8.

The enzymatic hydrolysis is conducted for a time period sufficient to effect hydrolysis of the protein material to a peptide material in which at least a majority of the peptides in the peptide material have a peptide chain length of 7 peptides or less, and preferably, the enzyme preparation has hydrolyzed the protein material in the slurry to a degree of hydrolysis of from about 35% to about 45%. The time period required to effect the hydrolysis is dependent on the temperature at which the hydrolysis is conducted, where less time is required at higher temperatures, and on the activity and concentration of the enzyme(s) utilized to hydrolyze the protein material, where less time is required with more active enzyme(s) and higher enzyme concentrations. In the temperature range and at the enzyme activities specified above, the time required to effect the hydrolysis may extend from about 15 minutes to about 24 hours, and more preferably is from about 30 minutes to about 3 hours, and most preferably is from about 1 hour to about 2 hours.

After the hydrolysis is complete, the slurry is heated to thermally deactivate the enzyme(s) in the enzyme preparation. The enzyme(s) may be deactivated by heating the slurry to at least 80° C. for a period of time sufficient to deactivate the enzyme(s). Preferably the slurry is heated to from about 80° C. to about 160° C. to deactivate the enzyme(s). In one embodiment, the slurry is heated to about 80° C. for about 5 minutes to deactivate the enzyme(s). In another embodiment, the slurry is heated to about 155° C. for about 10 seconds to effect the deactivation.

A solution of the protein hydrolyzate material of the present invention may then be separated from the slurry. The solution of protein hydrolyzate material is separated from the slurry by removing the insoluble materials in the slurry. The solution of protein hydrolyzate may be separated from the slurry by any conventional means for separating a solid material from a liquid. Particularly preferred methods of separating the solution from the slurry include centrifugation, where the solution is collected as the supernatant, and filtration, where the solution is collected as the filtrate.

In a most preferred embodiment, the protein hydrolyzate is separated from the slurry, then the enyzme(s) is thermally inactivated, followed by a final separation step in which a protein hydrolyzate solution is separated from any remaining insoluble materials. The inventors have discovered that this sequence of separation/inactivation steps is particularly effective for providing a protein hydrolyzate solution having a high degree of clarity. It is preferred that the separation steps be effected by centrifugation, and it is particularly preferred that the first separation step be effected by high speed centrifugation.

The protein hydrolyzate solution may be added directly to acidic beverages, sports drinks, nutritional beverages, and enteral solutions. Alternatively, the peptide material in the solution may be further processed by concentrating, or drying by conventional drying processes such as freeze-drying, tunnel-drying, or spray-drying. The dried or concentrated peptide materials may be incorporated into foods or beverages, or formed into nutritional supplements such as powders or tablets.

The peptide material produced by the method of the present invention is a peptide material containing free amino acids, where at least a majority, and preferably at least 85%, of the peptides in the peptide material have a peptide chain length of 7 peptides or less. Preferably at least a majority of the peptides in the peptide material have a peptide chain length of from 2 to 5 peptides. The free amino acid content in the peptide material of the invention is relatively high due to the exopeptidase activity of the enzyme(s), and free amino acids may be present in the peptide material from about 10% to about 20% by weight of the peptide material.

The peptide material produced by the method of the present invention is also very soluble in solutions having an acidic pH, even at the isoelectric point of the protein material from which the peptide material is derived. The peptide material is at least 95% soluble, and preferably is at least 99% soluble, in an aqueous solution having a pH at which the protein material from which the peptide material is derived is substantially insoluble. Preferably, the peptide material is at least 95% soluble, more preferably at least 99% soluble, in an aqueous solution having a pH of from about 3 to about 6, and more preferably is at least 95% soluble, even more preferably at least 99% soluble, in an aqueous solution having a pH of from about 4 to about 5. Most preferably, the peptide material is at least 95% soluble, preferably at least 99% soluble, in an aqueous solution having a pH at or about the isoelectric point of the protein material from which the peptide material is derived. For example, a peptide material derived from soy protein preferably is at least 95% soluble, and more preferably at least 99% soluble in an aqueous solution having a pH of from about 4.4 to about 4.6, and a peptide material derived from casein is preferably at least 95% soluble, and more preferably at least 99% soluble, in an aqueous solution having a pH of from about 4.6 to about 4.8.

The protein hydrolyzate solution or the concentrated or dried peptide material derived from the process of the present invention may be added to a solution to provide a nutritional composition which is a non-bitter beverage or an enteral composition, and which has a pH at which the protein material from which the peptide material is derived is substantially insoluble. The peptide material of the present invention may be added to an acidic solution, such as those commonly employed for beverages. Preferably a nutritional composition solution/beverage containing the peptide material has a pH of from about 1 to about 6, more preferably of from about 3 to about 5.5, and most preferably of from about 4 to about 5. The nutritional composition containing the peptide material is not subject to sedimentation or cloudiness since the peptide material is highly soluble in such solutions, even at a pH at which the protein material from which the peptide material is derived is insoluble. A nutritional composition containing the peptide material is particularly useful in sports drinks for providing easily absorbed nutrients to atheletes, and in enteral compositions as a health aid for providing easily absorbed nutrients to persons having impaired digestive capacity.

The following examples provide illustrations of the methods of the present invention, but are not to be interpreted as limiting the invention to the exemplified methods.

EXAMPLE 1

In a first experiment, the peptide material of the present invention is produced from a soy protein concentrate. Soy protein concentrate is slurried with hot water to a total solids content of 12.2% by weight, where the temperature of the water is 52° C. and the pH of the water is 4.5. The slurry is heated to a temperature of 82° C. for a period of 30 minutes to denature the soy protein. After denaturation, the slurry is cooled to a temperature of 50° C. An *Aspergillus oryzae* enzyme having both substantial endopeptidase and substantial exopeptidase activity is added to the cooled slurry to hydrolyze the soy protein, where the concentration of the added enzyme in the slurry is 1.2% by weight of the slurry solids. The slurry is treated with the enzyme for a period of 2 hours, during which the pH of the slurry is maintained at pH 4.5, the isoelectric point of the protein. After the hydrolysis period is complete the slurry is heated to 82° C. to deactivate the enzyme. The slurry is then centrifuged, and a solution of the protein hydrolyzate material of the present invention is separated from the insoluble materials as the supernatant. The supernatant is chilled to precipitate further insoluble materials, and is centrifuged to separate the solution of peptide material from these insoluble materials. The supernatant of the second separation is concentrated under vacuum at a temperature of 82° C., and the concentrated supernatant is spray dried to produce the peptide material of the present invention.

EXAMPLE 2

In a second experiment, the distribution of peptide chain lengths of the peptide material produced as set forth in Example 1 above is examined. The peptide material is subjected to 7 cycles of automated Edman degradation, and an amino acid analysis of the peptide material is conducted. The Edman degradation is performed with an automatic sequenator, where step-wise released phenylthiohydantoin amino acids are identified with an on-line HPLC on the basis of their elution times.

Peptide chain lengths are quantitated from the data from the Edman degradation and the amino acid analysis. About 85% of the total peptides in the peptide material are shorter than 7 peptides in length, and at least 50% of the peptides have a peptide chain length of from 2 to 5 peptides.

EXAMPLE 3

In a third experiment, the distribution of peptide chain lengths of a peptide material formed by hydrolyzing a protein material with an endopeptidase at a solution pH at which the protein material is soluble is examined for purposes of comparision with the peptide material of the present invention. A soy protein isolate is solvated in an aqueous solution having a pH of 8.5, where the soy protein isolate is present at 15% by weight of the solution. The protein is denatured by heating to 120° C., and then is cooled to 55° C. An endopeptidase enzyme having proteolytic activity at pH 8.5 is added to the cooled solution, where the enzyme is present in the solution at 0.8% by weight of the protein solids in the solution. The protein solution is treated with the enzyme for 30 minutes, after which the enzyme is thermally deactivated. The pH of the solution is adjusted to 4.5 to precipitate insoluble protein material, and a solution of the peptide material is separated from the insoluble protein material by centrifugation and recovery of the supernatant. A peptide material is recovered by concentrating the peptide solution and spray drying the concentrated peptide solution.

The peptide material is analyzed in the same manner as the peptide material of the present invention set forth in Example 2. The peptide material of the present invention contains far more short chain peptides than a peptide material formed by enzymolysis with only an endopeptidase under conditions at which the protein material is soluble.

EXAMPLE 4

In a fourth experiment, a peptide material produced by hydrolysis of a protein at the isoelectric point of the protein with a conventional protease is examined for comparison with the peptide material of the present invention. A slurry of isoelectric soy protein isolate is formed with water, where the solution contains 15% of the soy protein isolate by weight, and has a pH of 4.6. The slurry is then heated to approximately 68° C., and 0.5% by weight of the protein isolate (dry basis) of the enzyme papain is added to the slurry to hydrolyze the protein. The hydrolysis is conducted for 4 hours, after which the enzyme is thermally deactivated by heating the slurry to a temperature of 99° C. for 10 minutes. Any remaining insoluble material is separated by centrifugation, and the solution of hydrolyzed protein material is recovered. The insoluble material is washed, and the wash water is added to the solution of hydrolyzed material. The solution of hydrolyzed material is concentrated under vacuum to about 40% solids, and then is spray dried to form a peptide material.

Samples are formed of the peptide material (the "papain" sample) and the peptide material produced in accordance with Example 1 above. The degree of hydrolysis of each sample is measured by determining the absorption value at 420 nm of the samples after being treated with trinitrobenzene sulfonic acid (TNBS). TNBS reacts with primary amines to produce a chromophore which absorbs light at 420 nm. Primary amines occur in proteins as amino terminal groups and as the amino group of lysyl residues. Hydrolysis of a protein cleaves the protein and creates one new amino terminal with each break in the chain, therefore, measurement of the absorbance of the samples at 420 nm after treatment with TNBS indicates the degree that the protein material is hydrolyzed in the samples.

100 ml of 0.025 N NaOH is added to each of the samples, where one sample contains 0.1 g of the peptide material formed according to the procedure of Example 4, and the other sample contains 0.1 g of the peptide material of Example 1. The samples are stirred for 10 minutes, and then are filtered through Whatman No. 4 filter paper to remove insoluble materials. 2 ml of the filtrate of each sample is diluted to 10 ml with 8 ml of a sodium borate buffer which has been pH adjusted to pH 9.5 with NaOH. A control blank for calibrating absorbance is also formed by mixing 2 ml of a 0.025 N NaOH solution with 8 ml of the sodium borate buffer. 0.3 M of TNBS solution is added to 2 ml of each of the samples and the blank, the samples and the blank are mixed with the TNBS for 5 seconds, and then the samples and blank are placed in a light-free area for 15 minutes. 4 ml of sodium phosphate-sodium sulfite buffer is added to the each sample and the blank to terminate the TNBS reaction. The absorbance of the samples and the blank is then measured at 420 nm. The protein content of each sample is also measured, using the Kjeldahl or Kjel-Foss procedures.

The degree of hydrolysis is then calculated from the measured absorbance and the measured protein content by first calculating a TNBS value, and then calculating the degree of hydrolysis from the TNBS value. The TNBS value is calculated according to the following equation: TNBS $(NH_2 \text{ moles}/10^5 \text{ g protein}) = (As_{420} - Ab_{420})(8.073)(1/W)(F)(100/P)$; where $As_{420}$ is the TNBS absorbance of the sample at 420 nm; $Ab_{420}$ is the TNBS absorbance of the blank at 420 nm; W is the sample weight; F is a dilution factor; and P is the protein content (%) of the sample. The degree of hydrolysis (%) is calculated by the following equation: $DH=(((TNBS \text{ value})_{sample}-24)/885)(100)$.

The samples were determined to have the TNBS values and the degrees of hydrolysis set forth in Table 1.

TABLE 1

| Sample | TNBS value | DH (%) |
| --- | --- | --- |
| Papain sample (Example 4) | 118 | 10.5 |
| Peptide (Example 1) | 395 | 42.0 |

As shown in Table 1, the peptide material of the present invention is far more hydrolyzed than the peptide material hydrolyzed in Example 4.

EXAMPLE 5

In a fifth experiment, a peptide material produced by hydrolysis of a protein at the isoelectric point of the protein with a conventional protease after denaturation of the protein is examined for comparison with the peptide material of the present invention. A slurry of isoelectric soy protein isolate is formed with water, where the solution contains 10% of the soy protein isolate by weight and has a pH of 4.7. The mixture is then heated to approximately 99° C. for about 5 minutes, and then is cooled to about 66° C. Bromelin enzyme at 0.3%, by dry weight of the protein material, is added to the mixture, and the mixture is reacted with the enzyme for 4 hours. The mixture is then heated to 99° C. for 10 minutes to deactivate the enzyme. Any remaining insoluble material is separated by centrifugation, and the solution of hydrolyzed protein material is recovered. The insoluble material is washed, and the wash water is added to the solution of hydrolyzed material. The solution of hydrolyzed material is concentrated under vacuum to about 40% solids, and then is spray dried to form a peptide material.

The peptide material is analyzed to determine the degree of hydrolysis of the material in the manner set forth in Example 4 above, and is compared to the peptide material of the present invention. The results are set forth in Table 2 below.

TABLE 2

| Sample | TNBS value | DH (%) |
| --- | --- | --- |
| Bromelin sample (Example 5) | 146 | 13.5 |
| Polypeptide (Example 1) | 395 | 42.0 |

As shown in Table 1, the peptide material of the present invention is far more hydrolyzed than the peptide material hydrolyzed in Example 5.

EXAMPLE 6

In a sixth experiment, *Aspergillus oryzae* enzymes having different endo- and exopeptidase activities were analyzed for effectiveness in producing the peptide material of the present invention. Five samples of soy protein concentrate are washed with an acidic aqueous solution having a pH of 4.5, and then are slurried in acidic aqueous solutions having a pH of 4.5, where the sample slurries have a total solids content of 10–12% solids. The samples are then heated to 50° C. Each sample is treated with 1.2%, by dry weight of the slurry solids, of a separate *Aspergillus oryzae* enzyme for two hours, where two of the enzymes have insignificant exopeptidase activity. The enzymes in each sample are then inactivated by heating the samples to 82° C. for 5 minutes. The samples are then centrifuged, and the supernatent containing the soluble peptides is recovered. The solutions of soluble peptides of each sample are freeze-dried to provide a dry peptide material from each sample. The dried samples are then analyzed for TNBS and degree of hydrolysis as set forth in Example 4 above. The results are shown in Table 3 below.

TABLE 3

| Sample | Endopeptidase activity (TU/g) | Exopeptidase activity (LAP/g) | TNBS | DH (%) |
|---|---|---|---|---|
| A. oryzae 1 | 2620 | 12 | 278 | 29 |
| A. oryzae 2 | 2765 | 32 | 290 | 30 |
| A. oryzae 3 | 2750 | 550 | 425 | 45 |
| A. oryzae 4 | 2800 | 608 | 423 | 45 |
| A. oryzae 5 | 2340 | 697 | 395 | 42 |

As shown by the results in Table 3, enzymes not having substantial exopeptidase activity do not have sufficient proteolytic activity to provide the peptide material of the present invention. The enzymes having substantial exopeptidase activity along with substantial endopeptidase activity provide a degree of hydrolysis of at least 35%, and provide the peptide material of the present invention.

It will be appreciated by those skilled in the art that various changes may be made in the invention as disclosed without departing from the spirit of the invention. The invention is not to be the specifics of the disclosed embodiments, which are for the purpose of illustration, but rather is to be limited only by the scope of the appended claims and their equivalents.

What is claimed is:

1. A process for obtaining a non-bitter, acid-soluble protein hydrolysate material from a protein material, comprising:
    forming an aqueous slurry of a protein material at a pH at which said protein material is substantially insoluble;
    contacting an enzyme preparation having an endopeptidase activity of at least 2500 tyrosine units/g and an exopeptidase activity of at least 500 leucine aminopeptidase units/g with said protein in said slurry at a pH in which said protein material is substantially insoluble and at a temperature and for a period of time effective to hydrolyze said protein material into a peptide material containing peptides, where at least a majority of said peptides have a peptide chain length of 7 peptides or less, and where said peptide material is substantially soluble in said slurry.

2. A process in accordance with claim 1 wherein said enzyme preparation is formed of a combination of an enzyme having substantial endopeptidase activity and an enzyme having substantial exopeptidase activity.

3. A process in accordance with claim 1 wherein said enzyme preparation contains an enzyme having both substantial endopeptidase activity and substantial exopeptidase activity.

4. A process in accordance with claim 3 wherein the enzyme is a fungal enzyme derived from *Aspergillus oryzae*.

5. A process in accordance with claim 1 wherein said enzyme preparation hydrolyzes said protein material in said slurry to a degree of hydrolysis of from about 35% to about 45%.

6. A process in accordance with claim 1 wherein said slurry has a pH at about the isoelectric point of said protein material.

7. A process in accordance with claim 1 wherein said slurry has a pH of about 3 to about 6.

8. A process in accordance with claim 7 wherein said slurry has a pH of about 4 to about 5.

9. A process in accordance with claim 1 in which said slurry of protein material is treated at a temperature and for a time effective to denature said protein material prior to contacting said protein material with said enzyme preparation.

10. A process in accordance with claim 9 wherein said slurry is treated at a temperature of about 70° C. to about 160° C. for a period of about 5 seconds to about 30 minutes to denature said protein material.

11. A process in accordance with claim 1 wherein from about 0.1% to about 10% of said enzyme preparation, by weight of said protein material, is contacted with said protein material.

12. A process in accordance with claim 1 wherein said enzyme preparation is contacted with said said protein material at a temperature of about 30° C. to about 75° C. for a period of about 1 hour to about 3 hours to hydrolyze said protein material.

13. A process in accordance with claim 1 wherein said protein material is a vegetable protein material.

14. A process in accordance with claim 13 wherein said vegetable protein material is a soy protein material.

15. A process in accordance with claim 14 wherein said soy protein material is a soy protein concentrate or a soy protein isolate.

16. A process in accordance with claim 1 wherein said protein material is casein.

17. A process in accordance with claim 1, further comprising the step of separating a solution of said soluble peptide material from insoluble material in said slurry.

18. A process in accordance with claim 17, further comprising the step of inactivating said enzyme preparation after hydrolyzing said protein material into said peptide material.

19. A process in accordance with claim 18 further comprising a step of separating insoluble material from said solution of soluble peptide material after said step of inactivating said enzyme preparation, wherein said step of inactivating said enzyme preparation is effected after separating said solution of soluble peptide material from insoluble material in said slurry.

20. A process in accordance with claim 17 further comprising drying said solution of peptide material to produce a dry peptide material.

* * * * *